Nov. 20, 1934.  A. O. AUSTIN  1,981,716
INSULATION FOR ELECTRICAL APPARATUS
Filed March 5, 1931  2 Sheets-Sheet 1
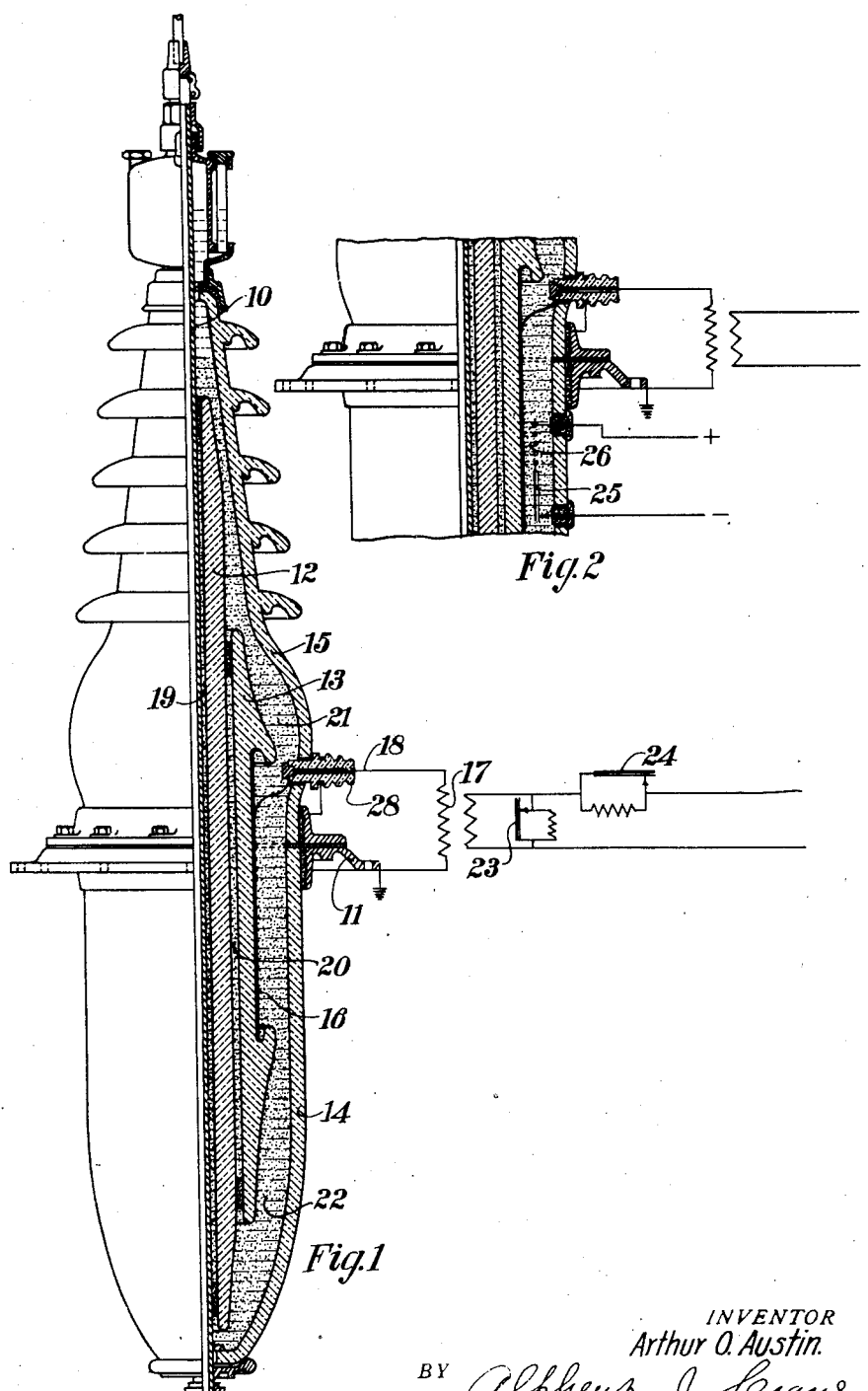
INVENTOR
Arthur O. Austin.
BY
ATTORNEY

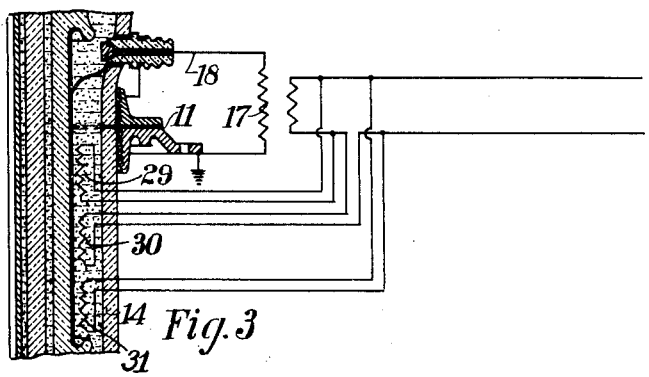
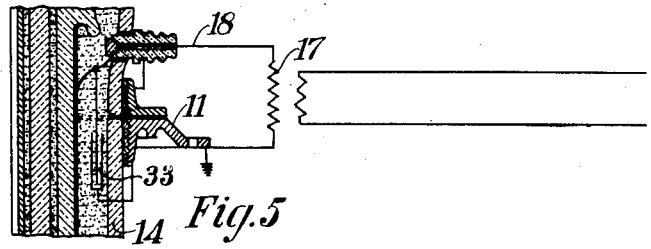
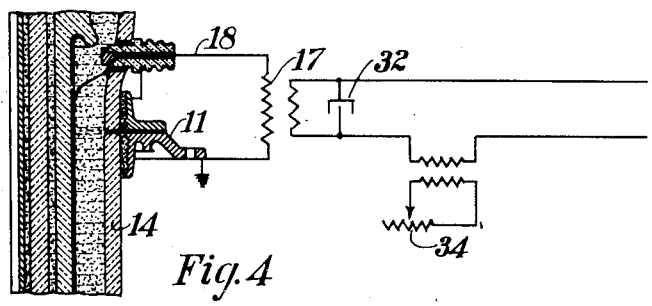
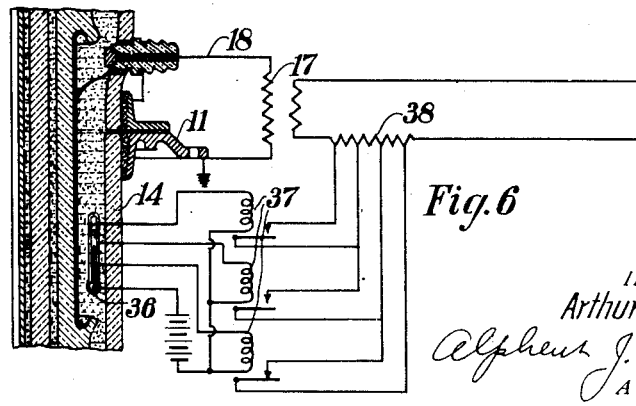

Patented Nov. 20, 1934

1,981,716

UNITED STATES PATENT OFFICE 1,981,716

INSULATION FOR ELECTRICAL APPARATUS

Arthur O. Austin, near Barberton, Ohio, assignor, by mesne assignments, to The Ohio Brass Company, Mansfield, Ohio, a corporation of New Jersey Application March 5, 1931, Serial No. 520,285

8 Claims. (Cl. 171—119)

This invention relates to capacitance members and dielectric filling material therefor, and has for one of its objects the provision of dielectric material for capacitance couplings which will have a substantially constant specific inductive capacity.

A further object of the invention is to increase the specific inductive capacity of filling material for capacitance couplings.

A further object is to provide filling material for capacitance couplings which will be less affected by moisture than material heretofore used.

A further object is to provide means for overcoming the effect of changes in temperature on capacitance couplings.

A further object is to provide a device of the class named which shall be of improved construction and operation.

Other objects and advantages will appear from the following description.

The invention is exemplified by the combination and arrangement of parts shown in the accompanying drawings and described in the following specification, and it is more particularly pointed out in the appended claims.

In the drawings:

Fig. 1 is an elevation with parts in section of a bushing insulator having one embodiment of the present invention applied thereto.

Fig. 2 is a fragmentary elevation of a part of a bushing insulator showing a modification of the invention.

Figs. 3, 4, 5 and 6 are views similar to Fig. 2 showing various circuits for compensating for variation in the characteristics of the capacitance coupling.

In oil filled bushings, particularly those used for high voltage, there may be, at times, an appreciable volumetric change in the oil or insulating compound due to changes in temperature. This is particularly true in the case of bushings for transformers of a conservator type where the lower ends of the bushings are subjected to the hot oil on the inside of the transformer housing. Roof or entrance bushings and their contents may be heated to a very large extent by heat from the sun. As the oil or insulating compound in the bushing has a rather large volumetric expansion compared to the material forming the shell of the bushing, it is necessary to make provision for this variation in volumetric expansion either by the use of expansion reservoirs or expansion space in the bushing.

If the amount of oil can be reduced, the amount of space required for expansion in the bushing, or the size of the expansion reservoirs may be materially reduced, thereby reducing the cost and size of a bushing for a given performance.

In bushings in which a capacitance coupling is used, it is important that the amount of oil or filling compound in the bushing be reduced to a minimum so that the electrical characteristics of the electrostatic coupling remain as nearly constant as possible.

It is well known that a filling medium such as transformer oil will take up water, which in turn will affect its specific inductive capacity materially. While an increase in the specific inductive capacity of the oil is produced when the oil takes up water, this may be an advantage insofar as the capacitance coupling is concerned but the presence of water in the oil lowers its dielectric strength and may interfere with the performance of the bushing, particularly if the bushing is subjected to very high voltages.

A change in the effective specific inductive capacity of the zones formed by the filling medium will of course change the characteristics of the capacitance coupling. This, as well as the effect of different temperatures, will tend to cause the capacitance coupling to vary, making it less suitable where accuracy is required over a considerable period of time. This applies particularly where a close regulation is required, and in cases where voltage or energy is supplied by capacitance couplings for relay operation, metering or other purposes.

In order to provide increased energy from the capacitance coupling, to reduce the volumetric change in the filling medium and to prevent change in the capacitance of the capacitance coupling caused by change in the specific inductive capacity of the filling medium when water is absorbed or lost by the filling medium, the present invention contemplates the use of a supplemental dielectric or filling medium which will reduce the quantity of the liquid filling medium in the zone affecting the dielectric strength and capacitance coupling. In general, this can be accomplished by filling the space largely with insulating baffles of material such as porcelain, glass or other substance which will not take up or lose water. For manufacturing reasons, however, it is difficult to fill with baffles all of the space between the metallic surfaces which have a difference in potential. It is generally advisable to allow some space between the parts to provide for irregularities, and also for an insulating medium which will provide insulation even in case some of the insulating sleeves or baffles are broken or damaged.

One method of improving the characteristics and the advantages outlined above is to fill the space between the baffles with a solid material made up in small pieces. This will displace a large part of the liquid filling medium and at the same time the specific inductive capacity of the dielectric in the filled space may be materially increased, providing the solid filling material has a higher specific inductive capacity than the liquid filling medium displaced. The solid material used for filling may be sand, or pieces composed of glass, porcelain or other material which has a higher specific inductive capacity than the liquid filling medium displaced.

The specific inductive capacity of the material used for filling material can be utilized to distribute or control the stress in the various zones in the bushing. If a zone of high stress is filled in with material having a higher specific inductive capacity than the liquid dielectric displaced, the stress over this zone will be reduced. The filling material may therefore be used to control the distribution of stress in the bushing as well as to control the effective capacitance, and to reduce the amount of liquid filling material required for filling in the voids or interstices.

By using a filling material which has pore spaces, it is possible to fill the pore spaces with water or other medium which will materially increase its specific inductive capacity. At the same time the surrounding structure of solid material will tend to maintain the dielectric strength of the particles so that the effective insulation will not be materially interfered with.

As it is exceedingly difficult to remove water or other liquid from material which has very small pore spaces, a porous filling material will tend to retain its moisture and thereby maintain a more constant condition than a filling medium such as insulating oil, which will take up or give off moisture readily under changes in temperature and humidity of the air with which it is in contact.

It is also possible to use insulating baffles made of refractory or ceramic materials which have pore spaces. This material if filled with water and immersed in a liquid dielectric medium will have a very high effective insulation and an increased effective specific inductive capacity. It is therefore possible to use insulating baffles as well as granular material having an increased specific inductive capacity in zones of higher stress such as that adjacent to the center electrode in a bushing.

The reduction of stress upon this zone will transfer the electrical stress to other zones, thereby tending to equalize the electrical stress. In addition, the increase in effective capacitance of the zones subjected to the higher stress due to position will also increase the effective capacitance and, consequently, the output of the capacitance coupling.

One advantage of the filling material is that it tends to prevent a discharge under high static stress which would tend to drive away the oil where the electrode surfaces terminate. The filling material may also be used to control the surface gradient on the outside of the bushing to an appreciable extent where it is possible to fill zones in such a way that the path of electrostatic flux will be directed by the filling material.

Several means may be used to control the stability of the insulating baffles, and the filling material used. By using a material for baffles and filling having very small pore spaces the retention of moisture or liquid in the pores which will increase the effective specific inductive capacity will be such that there will be little tendency to change the amount present. In some cases, however, where the pore spaces are relatively large, it may be necessary or advisable to cover the impregnated particles or baffles with a varnish, glaze or other material which will retain the entrapped moisture so it will not change with time. The insulating baffles may be glazed on one surface, which will seal the pores, and the unglazed surface, or openings left in the glaze for impregnating, may be covered with an insulating varnish or other material later. Very fine pore spaces may be equivalent to a pressure of several thousand pounds per square inch, in their effect on the retention of moisture, and if small openings are provided in the glaze, the material may be impregnated or largely saturated with water or other medium which will be retained even though conditions change materially. Where the pore spaces are larger, the impregnating may be materially accelerated by placing the whole under a high pressure in the liquid used for impregnating.

Fig. 1 shows one form of the invention applied to a transformer, circuit breaker, metering or other bushing. The bushing has a central electrode or conductor 10 and a mounting flange 11. Insulating baffles 12 and 13 are placed between the supporting flange 11 and the conductor 10. The insulating baffles are surrounded by shells 14 and 15. The baffle 13 carries a sleeve or zone 16 of conducting material insulated from the conductor 10 and the flange 11 and forming a capacitance coupling with the conductor 10. The primary 17 of a step-down transformer is connected by a lead 18 to the capacitance member 16, the other terminal of the transformer winding being grounded.

In order to improve the characteristics of the bushing and the capacitance coupling described above, the spaces 19, 20, 21 and 22 are filled with granular, solid, dielectric material having high specific inductive capacity as described above. In order to provide a grading effect, the material used in zone 19 may have a higher effective specific inductive capacity than the material used in the zone 20. The intervening space or interstices between the pieces of filling material can be filled with an insulating oil or compound of the necessary dielectric properties. The grading of the dielectric stress may have a material economic advantage in the construction of the bushing as a zone having a high stress under normal conditions may have a portion of the stress transferred to other zones by increasing the effective capacitance of the highly stressed zones by means of a filling having higher specific inductive capacity. One method would be to use a porous material in the inner zone 19 in Fig. 1, a non-porous material in 20 and oil in 21 and 22. The zones could of course be materially changed in size to meet the conditions of design. With this arrangement the zone 19 would have its capacitance increased through the absorption of moisture from the oil which would have but little or no effect upon the material in zone 20.

As vibration may tend to change the location of the various particles of the granular dielectric material and under some conditions may result in an increase in the mechanical stress set up between the parts, owing to unequal expansion and contraction, it may be desirable to retain the particles of filling material in a fixed position.

This can be readily accomplished in one of several ways. One method is to coat the pieces of filling material with a varnish, oil or other medium which can be used to stick the particles together after they have set a short time. This may be done by filling the bushing with the granular material and the binding material in liquid form and then drawing off excess binding material and allowing the remainder to harden either by drying or by the application of heat.

Another method is to apply a suitable varnish or oil to the granular particles after they have been impregnated with water and then allowing the varnish or oil to harden. The coated particles may then be handled in a manner similar to uncoated particles of filling material or sand. After the coated particles are in place in the bushing, the bushing with the filling material may be heated sufficiently to cause the material to soften and bind the several particles together. This will retain the particles in position and, at the same time, seal the pores and retain the material affecting the specific inductive capacity of the particles. It, of course, is also possible to hold the insulating baffles in place in the outer shell by the coating material on the several particles so that special holding means may be dispensed with. This is particularly true for some of the smaller size bushings in which the saving in cost will more than offset the ability readily to replace a part.

Where very fine control is necessary for the output on the capacitance coupling, this may be secured by controlling the temperature of the bushing, or by a compensating relay in the capacitance circuit.

The solid filling material will provide better control over the effective capacitance and the resulting phase angle of the capacitance coupling. Since, however, changes in temperature will affect the capacitance of the liquid dielectric used for filling and of the solid materials to some extent, a correction may be advisable for this condition. This correction may readily be made in any one of several ways.

One way is to use thermal relays 23 and 24 which can be designed to control either series, shunt, or a combination of series and shunt impedances. If desired a relay 25, as shown in Fig. 2, may be placed within the insulating zone of the bushing near the flange, where it will not be subjected to ambient temperature, and the lead brought through in any suitable manner. When the temperature reaches a certain value, a correcting impedance will either be inserted or removed from the capacitance circuit. This should preferably be on the low voltage side, although the correction may be applied to the high voltage side. The capacitance will then be corrected for the effect of the temperature change.

Another method is to use a heating element 26 which is actuated by the thermal relay 25 for control of the temperature of the bushing. This heating may be applied on any point in the bushing. If desired, the current flowing through the bushing may be caused to be shunted through a heating medium in the center of the bushing. The control may be largely confined to a single zone if desired. By using a heating element depending upon the current flowing through the bushing or from the outside, which will maintain the temperature of the oil or filling liquid substantially constant, a high degree of insulation will be maintained and the capacitance will vary but little. The fact that a large part of the liquid filling medium such as transformer oil is displaced by solid material, will tend to reduce the effect of changes in the specific inductive capacity of this medium due to changes in temperature and moisture content, thereby eliminating the necessity of further correcting means or reducing the amount of correction necessary.

Maintaining a temperature in the bushing slightly above the normal temperature is of material benefit as it will tend to keep the outer surface of the bushing dry and maintain the effective surface resistance of the bushing during fogs or other conditions where condensation or precipitation on the surface would lower the surface resistance. In general, foggy or rainy conditions occur at lower temperatures so that a temperature control on a bushing to obtain a close regulation of the capacitance coupling will usually insure a good surface condition. This is a further advantage as it affects the capacitance tap directly, as leakage over the surface of the bushing from capacitance tap to ground will materially affect the output of the capacitance coupling.

By making the lead 18 of a good heat conducting material, such as copper, the surface of the outlet bushing 28 will be maintained at a temperature above the dew point. This is equally desirable where the outlet comes directly through the upper or lower shell without the use of a bushing to increase the insulation. In fact, without the outlet bushing, it is more important to keep the surface dry than where the outlet bushing is used so that high effective insulation may be maintained at all times.

Another method of compensating for variations in the capacitance coupling is to use a resistance element 29, as shown in Fig. 3, which will have a coefficient of resistance for temperature changes such that a change in capacitance of the bushing due to temperature change will be offset by a change in the portion of current flowing out over the line. Correction can be rather closely approximated for differences in the output of the capacitance coupling, due to temperature changes. The shunting impedance 29 may be used in connection with a series impedance 30 and another shunting impedance 31. These impedances may be used singly or in any combination, depending upon the results desired. By using an impedance 30 which has a positive coefficient of resistance for temperature changes, the variation in the capacitance coupling caused by temperature changes may be effectively offset. The compensating impedances may be placed in the bushing so as to be subjected to substantially the same conditions as the coupling. The impedances 29, 30 and 31 may be of such character that they will utilize the energy they derive from the capacitance coupling for heating the dielectric material within the bushing to maintain its dielectric characteristic and to prevent accumulation of moisture on the outer surface of the bushing.

By using a condenser 32, as shown in Fig. 4, which has the same characteristics as the coupling condenser in the bushing, it is possible to offset changes in the bushing condenser since similar changes will take place in the condenser 32 but will have opposite effects on the current sent out over the line because of the different relations of the two condensers to the line and charging conductor.

The correcting condenser elements may be placed within the bushing, as shown at 33 in Fig. 5, so that any change in capacitance or resistance in the filling medium, as well as temperature, will tend to affect the correcting unit in the same way that the main capacitance condenser is affected. The correction condenser may either be connected in the primary circuit as shown in Fig. 5, or in the secondary circuit as shown in Fig. 4. The correction may be partially automatic as shown at 32 in Fig. 4, and partially manual as shown at 34. This method will give a close adjustment with a minimum amount of equipment. The impedances may be set so that the automatic element will compensate for variations over one range of temperature changes, and then another adjustment of the manual control may be made allowing the automatic elements to compensate for a different temperature range. The combination may be used both with the capacitance coupling only or where the bushing contains an internal current transformer as well, as shown in my prior Patent #1,723,000.

The compensating means may be entirely controlled by any temperature control devices such as a pyrometer or thermometer. This device may be made to control the adjusting impedance for any given temperature, the expansion bulb being placed in the bushing itself, as shown in Fig. 6, in which a simple form of thermally controlled contact making device, such as a mercury thermometer 36, controls relays 37 which cut out successive portions of the compensating impedance 38 as the temperature rises. Where the capacitance coupling is used for close control of phase angle as well as voltage, combinations of either shunt or series impedance may be such as to maintain the desired phase angle as well as voltage.

I claim:

1. The combination with a capacitance coupling, of means for controlling the temperature of the dielectric of said coupling to prevent changes in the specific inductive capacity of said element due to temperature changes.

2. The combination with an insulating bushing, of a capacitance coupling in said bushing, and means for heating the interior of said bushing to prevent changes in the characteristics of said capacitance coupling due to temperature changes.

3. The combination with a bushing having a capacitance coupling therein, of means disposed within the bushing and subjected to similar conditions to those of the coupling for controlling the output of the coupling to compensate for variations in the characteristics of the coupling.

4. The combination with a capacitance coupling subject to variation by ambient conditions, of a circuit energized by said coupling and a condenser subject to changes similar to those of said capacitance coupling, said condenser being connected in said circuit so that the changes in said condenser oppose the effects in said circuit of the changes in said coupling.

5. The combination with a capacitance coupling, of a housing for said coupling, an electrical circuit energized by said coupling and a condenser disposed within said housing and subject to conditions similar to those of said coupling and electrically connected with said circuit for compensating for variations in the current from said coupling due to variations from standard conditions within said housing.

6. The combination with a capacitance coupling, of a housing for said coupling, a circuit connected with said coupling, and compensating impedance in said circuit disposed within said housing and subject to variations in conditions similar to those of said coupling.

7. The combination with a capacitance coupling, of a housing for said coupling, a circuit energized by said coupling, compensating impedances in said circuit and a thermally operated device disposed within said housing for controlling said impedance.

8. The combination with a bushing insulator having a capacitance tap therein, of means energized from said capacitance tap for heating said insulator.

ARTHUR O. AUSTIN.